Sept. 19, 1939.  H. FÖTTINGER  2,173,713
HYDRAULIC GEAR
Filed Feb. 11, 1936
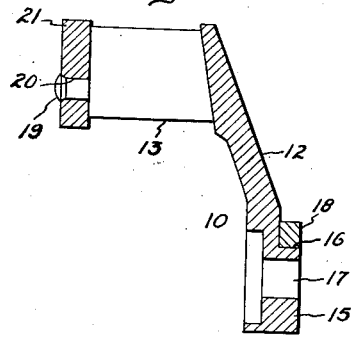
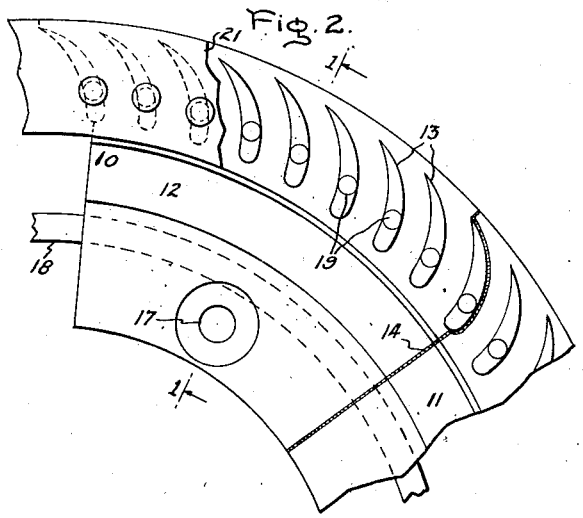
Inventor:
Hermann Föttinger,
by Harry E. Dunham
His Attorney.

Patented Sept. 19, 1939

2,173,713

UNITED STATES PATENT OFFICE 2,173,713

HYDRAULIC GEAR

Hermann Föttinger, Berlin-Charlottenburg, Germany

Application February 11, 1936, Serial No. 63,454
In Germany February 14, 1935

3 Claims. (Cl. 253—77)

The present invention relates to hydraulic gears of the Föttinger type in which torque is transmitted from a driving to a driven shaft by means including a driving impeller or pumping element and a driven impeller or turbine element secured to the shafts. These elements are in the form of bladed bodies comprising disks with rings of blades attached to the sides thereof. In addition, a stationary guiding member is usually provided for guiding the operating fluid between the driving and driven elements. The rotatable as well as the stationary elements are subject to considerable forces due to the hydraulic resistance set up by the operating fluid. The rotatable elements in addition are subject to high centrifugal forces during operation. To assure satisfactory operation and long life of hydraulic gears and to permit high specific loading thereof it becomes therefore paramount that the blades of the rotatable as well as the stationary elements be securely attached to the disks or other casing portions.

The object of my invention is to provide an improved construction and arrangement of bladed bodies for hydraulic gears whereby damage due to loosening of blades from their supports is substantially eliminated.

This is accomplished in accordance with my invention by the provision of a bladed body consisting of a plurality of bladed segments. Each segment has a support with blades integrally united therewith. These segments or segmental bodies are united to form a ring. With such an arrangement the segmental bodies may be machined from the whole, that is, from a massive block, and they may also be cast. Special advantages are obtained by producing these bladed segments by a die-casting process because such process permits accurate forming of the curved surfaces of the blades and the supports integrally united therewith without necessitating machining thereafter. The dividing of the annular body in a plurality of segmental bodies in this case has the additional advantage that the segmental bodies may be produced by means of a comparatively simple form. These advantages are also apparent when the segmental bodies are produced by the ordinary forming and casting processes. Uniting of the segmental bodies to form an annular body may be accomplished in several ways, for instance, by soldering or welding. Also, the supports for the blades may be united by means of a shrink ring. In other cases it may be desirable to unite the segmental bodies by securing them to a separate disk. The free ends of the blades are preferably connected together by means of a band or ring.

For a better understanding of what I believe to be novel and my invention, attention is directed to the following description and the claims appended thereto in connection with the accompanying drawing.

Fig. 1 of the drawing illustrates a cross-section through a bladed body for hydraulic gears embodying my invention, and Fig. 2 is a front view of Fig. 1, partly broken away, Fig. 1 being a sectional view along line I—I of Fig. 2.

The bladed body shown in the present instance is a driven element or turbine wheel and comprises a plurality of segments or segmental bodies 10, 11. Each segment has a segmental support 12 with a plurality of laterally projecting blades 13 integrally united with the inner surface of an outer portion of the support. The segmental bodies are assembled with their edges abutting each other. These edges are united by means of fused metal, such as welds 14. The inner portions of the segmental bodies are provided with flanges 15 defining shoulders 16 and having openings 17. As an additional means for securing the segmental bodies to each other, I have shown in the present instance a shrink ring 18 engaging the shoulders 16. The openings 17 are provided to permit in certain instances assembling of the segmental bodies by means of a disk and bolts projecting through the openings 17 and secured to the disk. The blades 13 are provided at their free ends with studs 19 projecting through and secured to openings 20 in a ring or band 21. As stated above, the manufacture of the segmental bodies or segments may be accomplished by machining them out of a massive block or by casting or a die casting process. The latter is especially advantageous in that it eliminates the necessity of machining the blades.

Having described my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A wheel for hydraulic gears comprising a plurality of bladed die cast sectors, which sectors when assembled form a ring-shaped member, each sector having near its outer periphery a plurality of equally spaced lateral projections in the form of curved blades integral at one end with said sector, the contacting edges of adjacent sectors having complementary curvatures corresponding to the curvature of the blades within the space defined by the length of the blades, and a ring member engaging the other ends of said blades.

2. A wheel for hydraulic gears comprising a plurality of bladed die cast sectors, which sectors when assembled form a ring-shaped member, each sector having near its outer periphery a plurality of equally spaced lateral projections in the form of curved blades integral at one end with said sector, the contacting edges of adjacent sectors having complementary curvatures corresponding to the curvature of the blades within the space defined by the length of the blades and the remaining portion of the contacting edges extending radially towards the center of the composite wheel, and a ring member engaging the other ends of said blades.

3. A wheel for hydraulic gears comprising a bladed die cast ring segment subdivided into a plurality of sector-shaped members, each sector having a plurality of laterally extending projections forming equally spaced curved blades integral at one end with said sector, the contacting edges of adjacent sectors having a curved and a radially extending portion, the curvature of said curved portion corresponding to the curvature of the blades, and a ring member engaging the other ends of said blades.

HERMANN FÖTTINGER.